United States Patent
Liang et al.

(10) Patent No.: US 12,108,409 B2
(45) Date of Patent: Oct. 1, 2024

(54) INFORMATION TRANSMITTING METHOD AND TERMINAL

(71) Applicant: VIVO MOBILE COMMUNICATION CO., LTD., Guangdong (CN)

(72) Inventors: Jing Liang, Chang'an Dongguan (CN); Siqi Liu, Chang'an Dongguan (CN); Qian Zheng, Chang'an Dongguan (CN); Yanxia Zhang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 443 days.

(21) Appl. No.: 17/485,379

(22) Filed: Sep. 25, 2021

(65) Prior Publication Data

US 2022/0015134 A1     Jan. 13, 2022

Related U.S. Application Data (63) Continuation of application No. PCT/CN2020/081021, filed on Mar. 25, 2020.

(30) Foreign Application Priority Data

Mar. 27, 2019   (CN) .......................... 201910239526.8

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1819* (2013.01); *H04W 72/1263* (2013.01); *H04W 80/02* (2013.01); *H04W 92/18* (2013.01)

(58) Field of Classification Search
CPC ... H04L 1/1819; H04L 1/1822; H04L 1/1896; H04W 72/1263; H04W 72/21; H04W 72/23; H04W 80/02; H04W 92/18
See application file for complete search history.

(56) References Cited

U.S. PATENT DOCUMENTS

| | | |
|---|---|---|
| 2012/0294213 A1 | 11/2012 | Chen et al. |
| 2017/0142741 A1 | 5/2017 | Kaur et al. |

(Continued)

FOREIGN PATENT DOCUMENTS

| | | |
|---|---|---|
| CN | 102088433 A | 6/2011 |
| CN | 106465320 A | 2/2017 |

(Continued)

OTHER PUBLICATIONS

"Confirmation of Configured UL Grant Type 2 Activation for Multiple Aggregated Cells" Ericsson, 3GPP TSG-RAN WG2 #AH NR 1801, Tdoc R2-1800708, Jan. 22, 2018.

(Continued)

*Primary Examiner* — Kashif Siddiqui
(74) *Attorney, Agent, or Firm* — Brooks Kushman P.C.

(57) ABSTRACT

This disclosure provides an information transmitting method and a terminal. The information transmitting method includes: transmitting a MAC PDU, where the MAC PDU includes a MAC CE, and the MAC CE is used to indicate that a terminal has received activation or deactivation signaling for a configured grant resource, or is used to indicate that a terminal has activated or deactivated a configured grant resource, or is used to request.

18 Claims, 3 Drawing Sheets

(51) Int. Cl.
  *H04W 72/1263* (2023.01)
  *H04W 80/02* (2009.01)
  *H04W 92/18* (2009.01)

(56) References Cited

U.S. PATENT DOCUMENTS

| | | | |
|---|---|---|---|
| 2018/0048994 | A1 | 2/2018 | Kwon et al. |
| 2018/0139734 | A1 | 5/2018 | Babaei et al. |
| 2018/0199334 | A1 | 7/2018 | Ying et al. |
| 2018/0367255 | A1 | 12/2018 | Jeon et al. |
| 2018/0367355 | A1 | 12/2018 | Jeon et al. |
| 2020/0029352 | A1 | 1/2020 | Aiba et al. |
| 2020/0107295 | A1* | 4/2020 | Lee .................. H04W 56/0045 |
| 2021/0014881 | A1* | 1/2021 | Aiba .................. H04B 7/0626 |

FOREIGN PATENT DOCUMENTS

| | | |
|---|---|---|
| CN | 107347215 A | 11/2017 |
| CN | 107534537 A | 1/2018 |
| CN | 109429353 A | 3/2019 |
| CN | 109479315 A | 3/2019 |
| KR | 20170112773 A | 10/2017 |

OTHER PUBLICATIONS

"MAC CE for activation/deactivation of semi-persistent SRS" ZTE, Sanechips, 3GPP Tsg Ran WG2 Meeting #101, R2-1801932, Feb. 26, 2018.

"Confirmation of Configured Grant Activation for Multiple Aggregated Cells" Ericsson, 3GPP TSG-RAN WG2 #101 NR, Tdoc R2-1803164, Feb. 26, 2018.

Written Opinion and International Search Report in Application No. PCT/CN2020/081021 dated Oct. 7, 2021.

CN Office Action in Application No. 201910239526.8 dated Dec. 15, 2020.

European Search Report in Application No. 20776916.7 Dated May 9, 2022.

* cited by examiner

INFORMATION TRANSMITTING METHOD AND TERMINAL

CROSS-REFERENCE TO RELATED APPLICATIONS

This application is a continuation application of International Application No. PCT/CN2020/081021 filed on Mar. 25, 2020, claims priority to Chinese Patent Application No. 201910239526.8, filed in China on Mar. 27, 2019, which is incorporated herein by reference in its entirety.

TECHNICAL FIELD

This disclosure relates to the field of communications technologies, and in particular, to an information transmitting method and a terminal.

BACKGROUND

The long term evolution LTE) system has supported sidelink since Release 12. Sidelink is used for direct data transmission between user equipments (UE) without a network device.

UE transmits sidelink control information (SCI) through a physical sidelink control channel (PSCCH), to schedule transmission of a physical sidelink shared channel (PSSCH) for data transmission. The transmission of SCI is done by broadcast, where a receive end does not feed back whether reception succeeds to the transmit end.

LTE sidelink is designed in support of two resource allocation modes: scheduled resource allocation (Scheduled resource allocation) and autonomous resource selection (autonomous resource selection). In the scheduled resource allocation mode, a network-side device performs control and allocates a resource to each UE. In the autonomous resource selection mode, UE autonomously selects a resource.

To meet requirements of low-latency or periodic services, new radio (NR) supports two types of uplink transmission for semi-persistent uplink scheduling grants (configured UL grant): type 1 (type 1) and type 2 (type 2).

A resource of configured UL grant type 1 may be semi-persistently configured by using radio resource control (RRC) signaling. After receiving the configuration, a user may perform transmission on the configured resource based on a service arrival status and configuration status of the user, without dynamic scheduling by downlink control information (DCI).

A resource of configured UL grant type 2 may be semi-persistently configured by using RRC signaling. After receiving the configuration, a user cannot directly use the configuration. The user cannot use the granted resource before a base station further activates the configuration by using activation DCI. The base station may also use DCI to deactivate the configuration, and the user receiving the deactivation DCI stops using the granted resource.

If a network-side device has transmitted deactivation signaling for a resource of configured sidelink grant type 2 but a user fails to receive or decode the deactivation signaling, the terminal may still transmit sidelink data on the resource of configured sidelink grant type 2. However, at that point, the network-side device thinks that the terminal has released the resource and may schedule sidelink transmission of another user on the resource, causing interference between sidelink transmission of different terminals; or the base station may reallocate the resource to the Uu interface, causing interference between sidelink transmission and transmission over Uu.

SUMMARY

Embodiments of this disclosure provide an information transmitting method and a terminal, to resolve a resource collision problem caused by inconsistent understanding of a network-side device and a terminal on an activation or deactivation status of a granted resource in a related technology.

To resolve the foregoing technical problem, this disclosure is implemented as follows: An information transmitting method applied to a terminal includes:

transmitting a media access control protocol data unit MAC PDU, where the MAC PDU includes a media access control control element MAC CE; and the MAC CE is used to indicate that the terminal has received activation or deactivation signaling for a configured grant resource, or is used to indicate that the terminal has activated or deactivated a configured grant resource, or is used to request to activate or deactivate a configured grant resource.

An embodiment of this disclosure further provides a terminal, including:

a transmitting module, configured to transmit a media access control protocol data unit MAC PDU, where the MAC PDU includes a media access control control element MAC CE;

the MAC CE is used to indicate that the terminal has received activation or deactivation signaling for a configured grant resource, or is used to indicate that the terminal has activated or deactivated a configured grant resource, or is used to request to activate or deactivate a configured grant resource; and the activation or deactivation signaling is used to activate or deactivate the configured grant resource.

An embodiment of this disclosure further provides a terminal, including a processor, a memory, and a computer program stored in the memory and capable of running on the processor. When the computer program is executed by the processor, the steps of the foregoing information transmitting method are implemented.

An embodiment of this disclosure further provides a computer-readable storage medium. The computer-readable storage medium stores a computer program. When the computer program is executed by a processor, the steps of the foregoing information transmitting method are implemented.

In the embodiments of this disclosure, the MAC CE is used to indicate that the terminal has received activation or deactivation signaling for the configured grant resource, or the MAC CE is used to indicate that the terminal has activated or deactivated the configured grant resource, or the MAC CE is used to indicate that the terminal is requesting to activate or deactivate the configured grant resource. This can achieve consistent understanding between a network-side device and the terminal on an activation or deactivation status of the granted resource, thereby avoiding resource collision caused by inconsistent understanding.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

DESCRIPTION OF EMBODIMENTS

The following clearly and completely describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

In the embodiments of this disclosure, terms such as "an example" or "for example" are used to represent an example, an illustration, or a description. Any embodiment or design solution described as "exemplary" or "for example" in the embodiments of this disclosure should not be construed as being more preferred or advantageous than other embodiments or design solutions. Specifically, the terms such as "an example" or "for example" are used to present related concepts in a specific manner.

Figure 1:
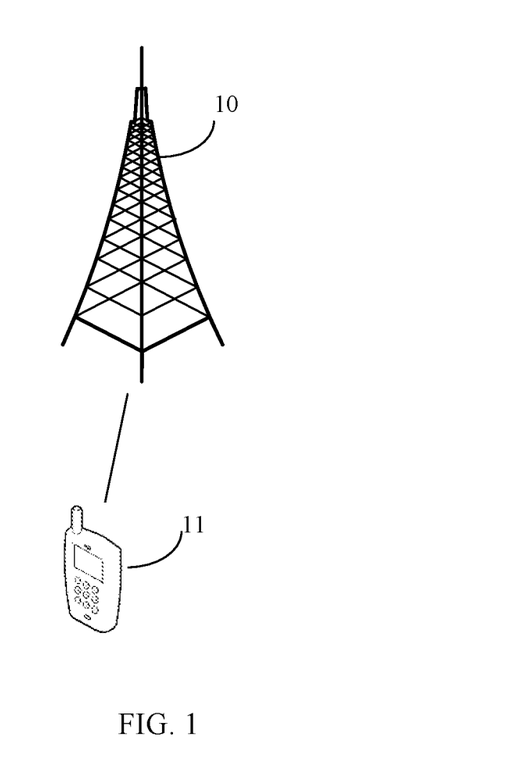
FIG. 1 is a schematic architectural diagram of a wireless communications system according to an embodiment of this disclosure.

The following describes the embodiments of this disclosure with reference to the accompanying drawings. An information transmitting method provided in the embodiments of this disclosure may be applied to a wireless communications system. The wireless communications system may be a 5G system, an evolved long term evolution (eLTE) system, or a later evolved communications system. FIG. 1 is a schematic architectural diagram of a wireless communications system according to an embodiment of this disclosure. As shown in FIG. 1, the wireless communications system may include a network-side device 10 and a terminal (the terminal may also be referred to as a user-side device). For example, the terminal is denoted as UE 11, and the UE 11 may be connected to the network-side device 10. In actual application, a connection between the foregoing devices may be a wireless connection. For ease of visually representing a connection relationship between the devices, a solid line is used for illustration in FIG. 1.

It should be noted that the communications system may include a plurality of UEs, and the network-side device may communicate (transmit signaling or transmit data) with the plurality of UEs.

The network-side device 10 provided in this embodiment of this disclosure may be a base station. The base station may be a commonly used base station, or may be an evolved NodeB (eNB), or may be a network-side device (for example, a next generation NodeB (next generation node base station, gNB) or a transmission and reception point (TRP)), a cell (cell), or other devices in a 5G system.

The terminal provided in this embodiment of this disclosure may be a mobile phone, a tablet computer, a notebook computer, an ultra-mobile personal computer (UMPC), a netbook, a wearable device (Wearable Device), an in-vehicle device, a personal digital assistant (PDA), or the like. It should be noted that a specific type of the terminal is not limited in the embodiments of this disclosure.

Figure 2:
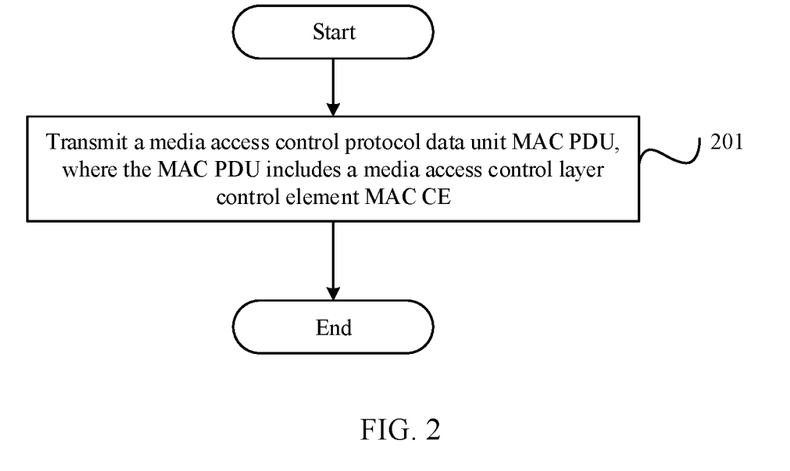
FIG. 2 is a schematic flowchart of an information transmitting method according to an embodiment of this disclosure.

As shown in FIG. 2, an embodiment of this disclosure provides an information transmitting method, applied to a terminal and including the following steps.

Step 201: Transmit a media access control protocol data unit MAC PDU, where the MAC PDU includes a media access control control element MAC CE.

The MAC CE is used to indicate that the terminal has received activation or deactivation signaling for a configured grant resource, or is used to indicate that the terminal has activated or deactivated a configured grant resource, or is used to request to activate or deactivate a configured grant resource.

The activation or deactivation signaling is used to activate or deactivate the configured grant resource.

In the foregoing embodiment of this disclosure, a manner of activating or deactivating the configured grant resource includes:

Manner 1: A network-side device activates or deactivates the configured grant resource by using the activation or deactivation signaling. In this manner, the MAC CE is used to indicate that the terminal has received the activation or deactivation signaling for the configured grant resource.

Correspondingly, in this manner, before the terminal transmits the MAC CE, the method further includes:

receiving the activation or deactivation signaling, where the activation or deactivation signaling is used to activate or deactivate the configured grant resource.

Manner 2: The terminal side actively initiates activation or deactivation for the configured grant resource. This manner includes two cases.

Case 1: The terminal directly initiates activation/deactivation for the corresponding grant resource, and the MAC CE transmitted to the network-side device only notifies a base station. In this case, an indication of "being activated (that is, having been activated)" or "being deactivated (that is, having been deactivated)" is transmitted. In this case, the MAC CE is used to indicate that the terminal has activated or deactivated the configured grant resource.

Optionally, the network-side device may return a confirmation message for the MAC CE. The MAC CE is initiated by the terminal and is used to indicate that the terminal has activated or deactivated the configured grant resource.

In this case, before the terminal transmits the MAC CE, the method further includes:

actively activating or deactivating, by the terminal, the configured grant resource.

Case 2: The MAC CE transmitted by the terminal is an activation or deactivation request, and the terminal can perform final confirmation only after the network-side device performs confirmation. The network-side device may approve the activation or deactivation request of the terminal, or may reject the activation or deactivation request of the terminal. In this case, the MAC CE is used to request to activate or deactivate the configured grant resource.

To sum up, in the foregoing embodiment of this disclosure, the MAC CE is used to perform feedback to the activation or deactivation signaling from the network side, or the MAC CE is used to indicate an activation status of the grant resource, or the MAC CE is used to request to activate or deactivate the grant resource. Consistent understanding between the network-side device and the terminal on an activation or deactivation status of the granted resource can be achieved based on the MAC CE, thereby avoiding a resource collision problem caused by inconsistent understanding.

In a preferred embodiment, when the manner of activating or deactivating the configured grant resource is the manner 1, design manners of the MAC CE are as follows.

Design manner 1: The MAC CE is identified by a MAC PDU subheader. The MAC PDU subheader includes a logical channel identifier LCID field.

In a case that a value of the LCID field is a first preset value, the MAC CE is used to indicate activation or deactivation confirmation for the grant resource.

In this preferred embodiment, a defined LCID value may be reused for the first preset value. For example, the first preset value is 55, that is, a function of the LCID field is configured grant confirmation (configured grant confirmation). In this embodiment of this disclosure, when the value of the LCID field is the first preset value, the MAC CE is used to indicate activation or deactivation confirmation for the grant resource.

The grant resource herein includes a sidelink grant resource and/or an uplink grant resource.

Further, as shown in FIG. 2, the MAC PDU subheader further includes a first bit field R1 and a second bit field R2.

The first bit field is used to indicate that the terminal has received activation or deactivation signaling for a sidelink grant resource, or activation or deactivation signaling for an uplink grant resource, and the second bit field is a reserved bit. That is, for the two reserved bits, one is used to indicate whether confirmation is specific to a sidelink grant resource or an uplink grant resource, and the other still serves as a reserved bit. For example, 0+R2 indicates that activation or deactivation signaling for a sidelink grant resource is received, and 1+R2 indicates that activation or deactivation signaling for an uplink grant resource is received. For another example, the network-side device transmits two activation or deactivation instructions separately for a sidelink grant resource and an uplink grant resource. The network-side device may determine, the first bit field of the received MAC CE, whether a confirmation message is specific to a sidelink grant resource or an uplink grant resource.

Alternatively, the first bit field is used to indicate that the terminal has received activation or deactivation signaling for a sidelink grant resource, or activation or deactivation signaling for an uplink grant resource, and the second bit field is used to indicate what the terminal has received is activation signaling or deactivation signaling. That is, for the two reserved bits, one is used to indicate whether confirmation is specific to a sidelink grant resource or an uplink grant resource, and the other is used to indicate whether activation signaling or deactivation signaling is received. For example, 00 indicates that an activation instruction for a sidelink grant resource is received, 01 indicates that a deactivation instruction for a sidelink grant resource is received, 10 indicates that an activation instruction for an uplink grant resource is received, and 11 indicates that a deactivation instruction for an uplink grant resource is received. This case may be used when the base station uses different signaling to activate and deactivate sidelink grant resources and uplink grant resources. For example, for sidelink grant resources, the base station transmits an activation instruction for sidelink grant resources 1+2+3 and a deactivation instruction for sidelink grant resources 4+5. In this case, the terminal may use 00 to indicate that the activation instruction for the sidelink grant resources 1+2+3 is received, and use 01 to indicate that the deactivation instruction for the sidelink grant resources 4+5 is received. For uplink grant resources, the base station transmits an activation instruction for uplink grant resources 1+2+3 and a deactivation instruction for uplink grant resources 4+5. In this case, the terminal may use 00 to indicate that the activation instruction for the uplink grant resources 1+2+3 is received, and use 01 to indicate that the deactivation instruction for the uplink grant resources 4+5 is received.

Alternatively, the first bit field is a reserved bit, and the second bit field is used to indicate what the terminal has received is activation signaling or deactivation signaling. That is, for the two reserved bits, one is used to indicate whether a confirmation message is specific to an activation instruction or a deactivation instruction, and the other still serves as a reserved bit. For example, 0+R indicates that activation signaling for a sidelink grant resource or an uplink grant resource is received, and 1+R indicates that deactivation signaling for a sidelink grant resource or an uplink grant resource is received.

Design manner 2: The MAC CE is identified by a MAC PDU subheader.

The MAC PDU subheader includes a logical channel identifier LCD field.

In a case that a value of the LCID field is a second preset value, the MAC CE is used to indicate that the terminal has received activation or deactivation signaling for a sidelink grant resource.

In this preferred embodiment, the second preset value is a reserved LCID value. For example, one of currently reserved indexes 33 to 51, for example, 33 or 51, may be used for the LCID field. For example, when the network-side device receives the MAC CE from the terminal, if LCD=33, it indicates that the terminal confirms reception of the activation or deactivation signaling for the sidelink grant resource that is transmitted by the network-side device.

Further, the MAC PDU subheader further includes a fifth bit field.

The fifth bit field is used to indicate what the terminal has received is activation signaling or deactivation signaling. That is, a reserved LCID is used to indicate that signaling for the sidelink grant resource is received. For example, one of currently reserved indexes 33 to 51, for example, 33 or 51, may be used for the LCD. Another reserved bit is used to indicate whether the signaling is activation signaling or deactivation signaling. For example, 1+R+LCID33 indicates that activation signaling for the sidelink grant resource is received, and 0+R+LCID33 indicates that deactivation signaling for the sidelink grant resource is received.

Alternatively, in a case that a value of the LCID field is a fifth preset value, the MAC CE is used to indicate that the terminal has received activation signaling for a sidelink grant resource, or in a case that a value of the LCID field is a sixth preset value, the MAC CE is used to indicate that the terminal has received deactivation signaling for a sidelink grant resource.

For example, when the network-side device receives the MAC CE from the terminal, if LCID=33, it indicates that the terminal confirms reception of the activation signaling for the sidelink grant resource that is transmitted by the network-side device; or if LCID=34, it indicates that the terminal confirms reception of the deactivation signaling for the sidelink grant resource that is transmitted by the network-side device.

Referring to the foregoing example, the MAC CE further includes a field whose size is not 0.

The field whose size is not 0 bits includes an identifier of at least one sidelink grant resource, or an identifier of at least one sidelink grant resource and an identifier of at least one hybrid automatic repeat request HARQ process.

It should be noted that carrying the identifier of a sidelink grant resource is to indicate that the current confirmation message specifically confirms activation or deactivation signaling for the specified granted sidelink resource; and that carrying the identifier of a sidelink grant resource and the identifier of a HARQ process is to indicate that the current confirmation message specifically confirms activation or deactivation signaling for a resource corresponding to the specified HARQ process in the specified sidelink grant resource.

Optionally, the identifier of a sidelink grant resource includes any one of the following:
- an index of the sidelink grant resource;
- an identifier of a destination terminal corresponding to the sidelink grant resource;
- an identifier of a source terminal corresponding to the sidelink grant resource;
- a group identifier of a group to which the sidelink grant resource belongs;
- an application layer identifier of the sidelink grant resource;
- an identifier of a service on the sidelink grant resource;
- an upper-layer identifier of the sidelink grant resource; and
- an identifier of a transmission mode of the sidelink grant resource, where the transmission mode includes unicast, multicast, or broadcast.

In a case that the MAC CE is used to indicate a confirmation message for a plurality of sidelink grant resources, in another implementation, the field whose size is not 0 bits includes first indication information, and the first indication information includes at least one indication bit.

A first state of each indication bit of the first indication information is used to indicate that the terminal has received activation signaling for a corresponding sidelink grant resource, and a second state of each indication bit of the first indication information is used to indicate that the terminal has received deactivation signaling for a corresponding sidelink grant resource.

For example, the $1^{st}$ indication bit corresponds to a sidelink grant resource whose number is 1, and the $2^{nd}$ indication bit corresponds to a sidelink grant resource whose number is 2. When the $1^{st}$ indication bit is 1, it indicates that activation signaling for the sidelink grant resource whose number is 1 is received. When the $1^{st}$ indication bit is 0, it indicates that deactivation signaling for the sidelink grant resource whose number is 1 is received.

For another example, each bit corresponds to an activation/deactivation instruction for one sidelink grant resource. When the bit is 0, it indicates confirming deactivation of the sidelink grant resource; or when the bit is 1, it indicates confirming activation of the sidelink grant resource. Alternatively, when the bit is 1, it indicates confirming deactivation of the sidelink grant resource; or when the bit is 0, it indicates confirming activation of the sidelink grant resource Alternatively, in a case that the MAC CE is used to indicate a confirmation message for a plurality of sidelink grant resources, in another implementation, the field whose size is not 0 bits includes second indication information, and the second indication information includes at least one indication bit.

A first state of each indication bit of the second indication information is used to indicate that the terminal has received activation or deactivation signaling for a corresponding sidelink grant resource, and a second state of each indication bit of the second indication information is used to indicate that the terminal has not received activation or deactivation signaling for a corresponding sidelink grant resource or a network has not configured a corresponding sidelink grant resource. For example, when the bit is 0, it indicates that reception of activation or deactivation signaling for the sidelink grant resource is confirmed; or when the bit is 1, it indicates that the sidelink grant resource is not configured or no activation or deactivation signaling for the sidelink grant resource is received.

It should be noted that the MAC CE is a variable-size MAC CE, or may be a fixed-size MAC CE. This is not specifically limited herein.

In another preferred embodiment, when the manner of activating or deactivating the configured grant resource is the manner 2, design manners of the MAC CE are as follows.

Design manner 3: The MAC CE is identified by a MAC PDU subheader. The MAC PDU subheader includes a logical channel identifier LCID field.

In a case that a value of the LCID field is a first preset value, the MAC CE is used to indicate that the terminal has activated or deactivated the grant resource, or is used to indicate that the terminal is requesting to activate or deactivate the grant resource.

In this preferred embodiment, a defined LCD value may be reused for the first preset value. For example, the first preset value is 55, that is, a function of the LCID field is configured grant confirmation (configured grant confirmation). Alternatively, the first preset value may be a reserved LCID value. For example, one of currently reserved indexes 33 to 51, for example, 34, may be used for the LCID field. In this embodiment of this disclosure, when the value of the LCID field is the first preset value, the MAC CE is used to indicate that the terminal has activated or deactivated the grant resource, in other words, the MAC CE is used to indicate that the terminal is requesting to activate or deactivate the grant resource.

Further, the MAC PDU subheader includes a third bit field.

The third bit field is used to indicate that the terminal has activated the configured grant resource, or is used to indicate that the terminal has deactivated the configured grant resource.

Alternatively, the MAC PDU subheader includes a fourth bit field.

The fourth bit field is used to indicate that the terminal is requesting to activate the configured grant resource, or is used to indicate that the terminal is requesting to deactivate the configured grant resource.

It should be noted that, in this embodiment of this disclosure, a fixed-size or variable-size MAC CE is used, and a reserved LCID or LCID=55 (namely, the first preset value) is used to indicate that a sidelink grant resource is activated or deactivated, or a sidelink grant resource is requested to be activated or deactivated. Another reserved bit is used to indicate whether activation or deactivation is specifically performed.

Referring to the foregoing example, the MAC CE further includes a field whose size is not 0.

The field whose size is not 0 bits includes an identifier of at least one sidelink grant resource, or an identifier of at least one sidelink grant resource and an identifier of at least one hybrid automatic repeat request HARQ process.

It should be noted that carrying the identifier of a sidelink grant resource is to indicate which sidelink grant resource has currently been activated or deactivated or which sidelink grant resource is being requested to be activated or deactivated. Carrying the identifier of a sidelink grant resource and the identifier of a HARQ process is to indicate a resource corresponding to which HARQ process in which sidelink grant resource has currently been activated or deactivated, or a resource corresponding to which HARQ process in which sidelink grant resource is being requested to be activated or deactivated.

Optionally, the identifier of a sidelink grant resource includes any one of the following:
an index of the sidelink grant resource;
an identifier of a destination terminal corresponding to the sidelink grant resource;
an identifier of a source terminal corresponding to the sidelink grant resource;
a group identifier of a group to which the sidelink grant resource belongs;
an application layer identifier of the sidelink grant resource;
an identifier of a service on the sidelink grant resource;
an upper-layer identifier of the sidelink grant resource; and
an identifier of a transmission mode of the sidelink grant resource.

In a case that the MAC CE is used to indicate that an activation or deactivation operation is performed on a plurality of sidelink grant resources or a plurality of sidelink grant resources are requested to be activated or deactivated, in another implementation, the field whose size is not 0 bits includes first indication information, and the first indication information includes at least one indication bit.

A first state of each indication bit of the first indication information is used to indicate that the terminal has activated a corresponding sidelink grant resource, and a second state of each indication bit of the first indication information is used to indicate that the terminal has deactivated a corresponding sidelink grant resource;
or
a first state of each indication bit of the first indication information is used to indicate that the terminal is requesting to activate a corresponding sidelink grant resource, and a second state of each indication bit of the first indication information is used to indicate that the terminal is requesting to deactivate a corresponding sidelink grant resource.

Alternatively, in a case that the MAC CE is used to indicate that an activation or deactivation operation is performed on a plurality of sidelink grant resources or a plurality of sidelink grant resources are requested to be activated or deactivated, in another implementation, the field whose size is not 0 bits includes second indication information, and the second indication information includes at least one indication bit.

A first state of each indication bit of the second indication information is used to indicate that the terminal has activated or deactivated a sidelink grant resource, and a second state of each indication bit of the second indication information is used to indicate that the terminal has not activated or deactivated a sidelink grant resource or a network has not configured a corresponding sidelink grant resource;
or
a first state of each indication bit of the second indication information is used to indicate that the terminal is requesting to activate or deactivate a sidelink grant resource, and a second state of each indication bit of the second indication information is used to indicate that the terminal is not requesting to activate or deactivate a sidelink grant resource or a network has not configured a corresponding sidelink grant resource.

Design manner 4: The MAC CE is identified by a MAC PDU subheader.

The MAC PDU subheader includes a logical channel identifier LCID field.

In a case that a value of the LCID field is a third preset value, the MAC CE is used to indicate that the terminal has activated or deactivated a sidelink grant resource; or
in a case that a value of the LCID field is a fourth preset value, the MAC CE is used to indicate that the terminal is requesting to activate or deactivate a sidelink grant resource.

It should be noted that the second preset value, the third preset value, and the fourth preset value may be a same value, or may be different values.

In an optional embodiment of this disclosure, two reserved bits are still reserved. A reserved LCID may be used to indicate that a sidelink grant resource is activated or deactivated, or used to indicate that the terminal is requesting to activate or deactivate a sidelink grant resource. For example, one of currently reserved indexes 33 to 51 may be used for the LCID. For example, LCID=34 indicates that the sidelink grant resource is activated or deactivated (whether the sidelink grant resource specifically activated or deactivated depends on a current status, and if the sidelink grant resource is currently not activated, the signaling indication information is "activated"). Alternatively, two different values of the LCID may be used to indicate activation and deactivation respectively.

Specifically, in a case that a value of the LCID field is a seventh preset value, the MAC CE is used to indicate that the terminal has activated a sidelink grant resource, or in a case that a value of the LCID field is an eighth preset value, the MAC CE is used to indicate that the terminal has deactivated a sidelink grant resource; or
in a case that a value of the LCID field is a ninth preset value, the MAC CE is used to indicate that the terminal is requesting to activate a sidelink grant resource, or in a case that a value of the LCID field is a tenth preset value, the MAC CE is used to indicate that the terminal is requesting to deactivate a sidelink grant resource.

It should be noted that the fifth preset value, the seventh preset value, and the ninth preset value may be a same value, or may be different values; and the sixth preset value, the eighth preset value, and the tenth preset value may be a same value, or may be different values.

Specifically, when one value of the LCID is used to indicate activation or deactivation, the MAC PDU subheader further includes a fifth bit field.

The fifth bit field is used to indicate that the terminal has activated the grant resource or deactivated the grant resource; or the fifth bit field is used to indicate that the terminal is requesting to activate the grant resource or deactivate the grant resource.

A reserved LCID is used to indicate that the sidelink grant resource is activated or deactivated, or the sidelink grant resource is requested to be activated or deactivated. For example, one of currently reserved indexes 33 to 51, for example, 33 or 51, may be used for the LCD. Another reserved bit is used to indicate whether activation or deactivation is performed. For example, 1+R+LCID33 indicates that the sidelink grant resource is activated, and 0+R+LCID33 indicates that the sidelink grant resource is deactivated.

Further, the MAC CE further includes a field whose size is not 0.

The field whose size is not 0 bits includes first indication information, and the first indication information includes at least one indication bit.

A first state of each indication bit of the first indication information is used to indicate that the terminal has activated a corresponding sidelink grant resource, and a second state of each indication bit of the first indication information is used to indicate that the terminal has deactivated a corresponding sidelink grant resource;
or
a first state of each indication bit of the first indication information is used to indicate that the terminal is requesting to activate a corresponding sidelink grant resource, and a second state of each indication bit of the first indication information is used to indicate that the terminal is requesting to deactivate a corresponding sidelink grant resource.

Alternatively, the MAC CE further includes a field whose size is not 0.

The field whose size is not 0 bits includes second indication information, and the second indication information includes at least one indication bit.

A first state of each indication bit of the second indication information is used to indicate that the terminal has activated or deactivated a sidelink grant resource, and a second state of each indication bit of the second indication information is used to indicate that the terminal has not processed a sidelink grant resource or a network has not configured a corresponding sidelink grant resource;
or
a first state of each indication bit of the second indication information is used to indicate that the terminal is requesting to activate or deactivate a sidelink grant resource, and a second state of each indication bit of the second indication information is used to indicate that the terminal is not requesting to process a sidelink grant resource or a network has not configured a corresponding sidelink grant resource.

The processing the sidelink grant resource includes activating or deactivating the sidelink grant resource.

In another optional embodiment, the MAC CE includes a buffer status report BSR, the BSR is identified by a MAC PDU subheader, and the MAC PDU subheader includes a fifth bit field and a logical channel identifier LCID field used to identify the MAC CE as a BSR. For example, when the LCID field is 59, the MAC CE is a short truncated BSR; when the LCID field is 60, the MAC CE is a long truncated BSR; when the LCID field is 61, the MAC CE is a short BSR; or when the LCID field is 62, the MAC CE is a long BSR.

Figure 3:
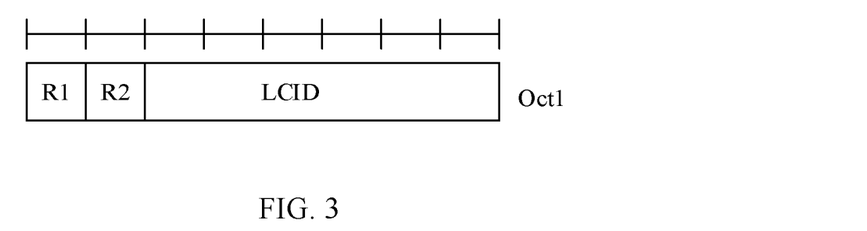
FIG. 3 is a first schematic structural diagram of a MAC PDU subheader in an information transmitting method according to an embodiment of this disclosure.
Figure 4:
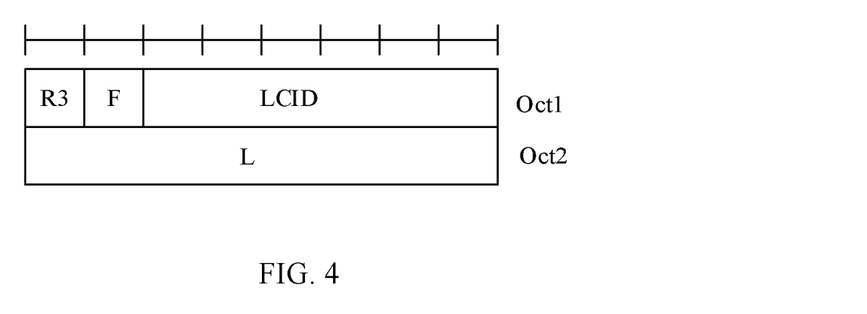
FIG. 4 is a second schematic structural diagram of a MAC PDU subheader in an information transmitting method according to an embodiment of this disclosure.
Figure 5:
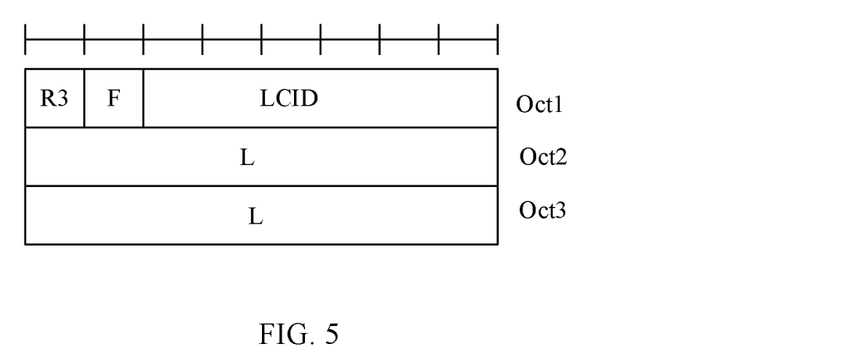
FIG. 5 is a third schematic structural diagram of a MAC PDU subheader in an information transmitting method according to an embodiment of this disclosure.

As shown in FIG. 3 or FIG. 4, the fifth bit field R3 is used to indicate that the terminal has received activation or deactivation signaling for a sidelink grant resource, or is used to indicate that the terminal has activated or deactivated a sidelink grant resource, or is used to indicate that the terminal is requesting to activate or deactivate a sidelink grant resource.

Alternatively, the MAC CE further includes a first indication field.

The first indication field is used to carry an identifier of an activated or deactivated sidelink grant resource, or is used to carry an identifier of a sidelink grant resource that the terminal is requesting to activate or deactivate, or is used to carry an identifier of an activated or deactivated sidelink grant resource and an identifier of a HARQ process, or is used to carry an identifier of a sidelink grant resource that the terminal is requesting to activate or deactivate and an identifier of a HARQ process.

The first indication field has a fixed or variable size, and may be specifically set before or after the $1^{st}$ target information, buffer size information, or logical channel group information, or may be set before or after the last target information, buffer size information, or logical channel group information.

In this case, an L field of the subheader is used to indicate an overall size of the logical channel group information, the buffer size information, the target information, and sidelink grant resource activation or deactivation information.

Alternatively, the MAC CE further includes a second indication field.

The second indication field includes at least one indication bit.

A first state of each indication bit of the second indication field is used to indicate that the terminal has received activation signaling for a corresponding sidelink grant resource, and a second state of each indication bit of the second indication field is used to indicate that the terminal has received deactivation signaling for a corresponding sidelink grant resource;
or
a first state of each indication bit of the second indication field is used to indicate that the terminal has activated a corresponding sidelink grant resource, and a second state of each indication bit of the second indication field is used to indicate that the terminal has deactivated a corresponding sidelink grant resource;
or
a first state of each indication bit of the second indication field is used to indicate that the terminal is requesting to activate a corresponding sidelink grant resource, and a second state of each indication bit of the second indication field is used to indicate that the terminal is requesting to deactivate a corresponding sidelink grant resource.

The second indication field has a fixed or variable size, and may be specifically set before or after the $1^{st}$ target information, buffer size information, or logical channel group information, or may be set before or after the last target information, buffer size information, or logical channel group information.

In this case, an L field of the subheader is used to indicate a total size of the logical channel group information, buffer size information, target information, and sidelink grant resource activation or deactivation information.

Further, in a case that the MAC CE is used to request to activate or deactivate a configured grant resource, the method further includes:
receiving reply information, where the reply information is used to indicate to the terminal that the terminal is allowed to activate or deactivate the grant resource, or the reply information is used to indicate to the terminal that the terminal is not allowed to activate or deactivate the grant resource.

Optionally, the reply information includes any one of the following:

an identifier of the grant resource that the terminal is allowed to activate or deactivate, used to indicate agreement to an activation/deactivation operation that is in an activation/deactivation instruction of the terminal and that is specific to the specified sidelink grant resource;

an identifier of the grant resource that the terminal is allowed to activate or deactivate and an identifier of a HARQ process, used to indicate agreement to an activation/deactivation operation that is in an activation/deactivation instruction of the terminal and that is specific to a resource corresponding to the identifier of the HARQ process in the specified sidelink grant resource; and third indication information including at least one indication bit, where each indication bit of the third indication information is used to indicate whether the terminal is allowed to activate or deactivate a corresponding grant resource, for example, 0 indicates being allowed, and 1 indicates being not allowed.

In still another optional embodiment, in a case that at least two MAC CEs are to be transmitted, the method further includes:

transmitting the MAC CEs according to a preset priority rule, where the preset priority rule includes:

that a MAC CE used for a cell radio network temporary identifier C-RNTI or used to carry data from an uplink common control channel has a higher priority than a MAC CE for an uplink grant resource, and that a MAC CE for an uplink grant resource has a higher priority than a MAC CE for a sidelink grant resource; or the preset priority rule includes:

that a MAC CE used for a cell radio network temporary identifier C-RNTI or used to carry data from an uplink common control channel UL-CCCH has a higher priority than a MAC CE for an uplink grant resource, and that a MAC CE for an uplink grant resource has the same priority as a MAC CE for a sidelink grant resource.

When a MAC CE 1 for a sidelink grant resource and a MAC CE 2 for an uplink grant resource are transmitted separately, that is, when a MAC PDU includes either the MAC CE 1 or the MAC CE 2, transmission is performed according to the following priority order (a descending order of priorities):

the MAC CE is used for a C-RNTI or data from a UL-CCCH;

the MAC CE 2 for the uplink grant resource or the MAC CE 1 for the sidelink grant resource;

the MAC CE 1 for the sidelink grant resource;

the MAC CE is used for a BSR (a BSR of a Uu interface), except for a padding BSR;

the MAC CE is used for a power headroom PHR;

data from any logical channel, except for data from a UL-CCCH;

the MAC CE is used to obtain a recommended bit rate; and the MAC CE is used for a padding BSR.

Supplementary description: Relatively common MAC layer data types are listed above, and it is not excluded that new MAC layer data types are to be added in the future. The MAC CE 1 for the sidelink grant resource conforms to the following general priority principle: The priority of the MAC CE 1 is lower than that of MAC control elements and data (for example, CCCH data and status confirmation) used for the terminal or a MAC layer status, and is slightly lower than or the same as that of the MAC CE 2 for the uplink grant resource, but is higher than that of other data transmission and optimization reporting. In addition, the foregoing priority descriptions are all specific to uplink, unless sidelink is explicitly specified.

To sum up, in this embodiment of this disclosure, the MAC CE is used to indicate that the terminal has received activation or deactivation signaling for the configured grant resource, or the MAC CE is used to indicate that the terminal has activated or deactivated the configured grant resource, or the MAC CE is used to indicate that the terminal is requesting to activate or deactivate the configured grant resource. This can achieve consistent understanding between a network-side device and the terminal on an activation or deactivation status of the granted resource, thereby avoiding a resource collision problem caused by inconsistent understanding. In this embodiment of this disclosure, sidelink grant resource activation or deactivation initiated by a user is further implemented, so that activation or deactivation manners are more flexible and diverse.

Figure 6:
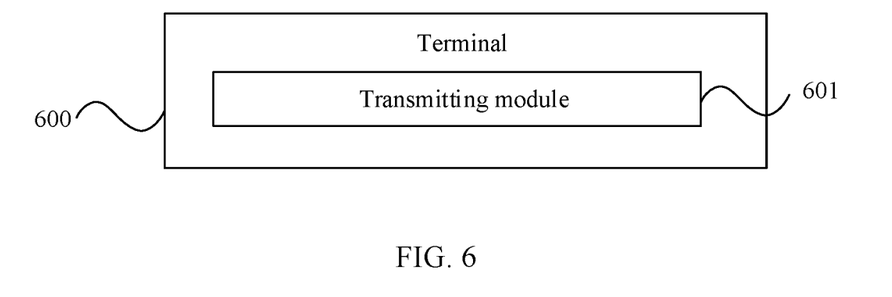
FIG. 6 is a first schematic structural diagram of a terminal according to an embodiment of this disclosure.

As shown in FIG. 6, an embodiment of this disclosure further provides a terminal, including:

a transmitting module 601, configured to transmit a media access control protocol data unit MAC PDU, where the MAC PDU includes a media access control control element MAC CE.

The MAC CE is used to indicate that the terminal has received activation or deactivation signaling for a configured grant resource, or is used to indicate that the terminal has activated or deactivated a configured grant resource, or is used to request to activate or deactivate a configured grant resource.

The activation or deactivation signaling is used to activate or deactivate the configured grant resource.

Optionally, in the foregoing embodiment of this disclosure, the MAC CE is identified by a MAC PDU subheader. The MAC PDU subheader includes a logical channel identifier LCID field.

In a case that a value of the LCID field is a first preset value, the MAC CE is used to indicate activation or deactivation confirmation for the grant resource.

Optionally, in the foregoing embodiment of this disclosure, the MAC PDU subheader further includes a first bit field and a second bit field.

The first bit field is used to indicate that the terminal has received activation or deactivation signaling for a sidelink grant resource, or activation or deactivation signaling for an uplink grant resource, and the second bit field is a reserved bit;

or the first bit field is used to indicate that the terminal has received activation or deactivation signaling for a sidelink grant resource, or activation or deactivation signaling for an uplink grant resource, and the second bit field is used to indicate what the terminal has received is activation signaling or deactivation signaling;

or the first bit field is a reserved bit, and the second bit field is used to indicate what the terminal has received is activation signaling or deactivation signaling.

Optionally, in the foregoing embodiment of this disclosure, the MAC PDU subheader includes a third bit field.

The third bit field is used to indicate that the terminal has activated the configured grant resource, or is used to indicate that the terminal has deactivated the configured grant resource.

Optionally, in the foregoing embodiment of this disclosure, the MAC PDU subheader includes a fourth bit field.

The fourth bit field is used to indicate that the terminal is requesting to activate the configured grant resource, or is used to indicate that the terminal is requesting to deactivate the configured grant resource.

Optionally, in the foregoing embodiment of this disclosure, the MAC CE is identified by a MAC PDU subheader.

The MAC PDU subheader includes a logical channel identifier LCID field.

In a case that a value of the LCID field is a second preset value, the MAC CE is used to indicate that the terminal has received activation or deactivation signaling for a sidelink grant resource; or
- in a case that a value of the LCID field is a third preset value, the MAC CE is used to indicate that the terminal has activated or deactivated a sidelink grant resource; or
- in a case that a value of the LCID field is a fourth preset value, the MAC CE is used to indicate that the terminal is requesting to activate or deactivate a sidelink grant resource.

Optionally, in the foregoing embodiment of this disclosure, the MAC CE is identified by a MAC PDU subheader.

The MAC PDU subheader includes a logical channel identifier LCID field.

In a case that a value of the LCID field is a fifth preset value, the MAC CE is used to indicate that the terminal has received activation signaling for a sidelink grant resource, or in a case that a value of the LCID field is a sixth preset value, the MAC CE is used to indicate that the terminal has received deactivation signaling for a sidelink grant resource; or
- in a case that a value of the LCID field is a seventh preset value, the MAC CE is used to indicate that the terminal has activated a sidelink grant resource, or in a case that a value of the LCID field is an eighth preset value, the MAC CE is used to indicate that the terminal has deactivated a sidelink grant resource; or
- in a case that a value of the LCID field is a ninth preset value, the MAC CE is used to indicate that the terminal is requesting to activate a sidelink grant resource, or in a case that a value of the LCID field is a tenth preset value, the MAC CE is used to indicate that the terminal is requesting to deactivate a sidelink grant resource.

Optionally, in the foregoing embodiment of this disclosure, the MAC PDU subheader further includes a fifth bit field.

The fifth bit field is used to indicate what the terminal has received is activation signaling or deactivation signaling;
or
the fifth bit field is used to indicate that the terminal has activated the grant resource or deactivated the grant resource;
or
the fifth bit field is used to indicate that the terminal is requesting to activate the grant resource or deactivate the grant resource.

Optionally, in the foregoing embodiment of this disclosure, the MAC CE further includes a field whose size is not 0.

The field whose size is not 0 bits includes an identifier of at least one sidelink grant resource, or an identifier of at least one sidelink grant resource and an identifier of at least one hybrid automatic repeat request HARQ process.

Optionally, in this embodiment of this disclosure, the identifier of a sidelink grant resource includes any one of the following:
- an index of the sidelink grant resource;
- an identifier of a destination terminal corresponding to the sidelink grant resource;
- an identifier of a source terminal corresponding to the sidelink grant resource;
- a group identifier of a group to which the sidelink grant resource belongs;
- an application layer identifier of the sidelink grant resource;
- an identifier of a service on the sidelink grant resource;
- an upper-layer identifier of the sidelink grant resource; and
- an identifier of a transmission mode of the sidelink grant resource.

Optionally, in the foregoing embodiment of this disclosure, the MAC CE further includes a field whose size is not 0.

The field whose size is not 0 bits includes first indication information, and the first indication information includes at least one indication bit.

A first state of each indication bit of the first indication information is used to indicate that the terminal has received activation signaling for a corresponding sidelink grant resource, and a second state of each indication bit of the first indication information is used to indicate that the terminal has received deactivation signaling for a corresponding sidelink grant resource;
or
- a first state of each indication bit of the first indication information is used to indicate that the terminal has activated a corresponding sidelink grant resource, and a second state of each indication bit of the first indication information is used to indicate that the terminal has deactivated a corresponding sidelink grant resource;
or
- a first state of each indication bit of the first indication information is used to indicate that the terminal is requesting to activate a corresponding sidelink grant resource, and a second state of each indication bit of the first indication information is used to indicate that the terminal is requesting to deactivate a corresponding sidelink grant resource.

Optionally, in the foregoing embodiment of this disclosure, the MAC CE further includes a field whose size is not 0.

The field whose size is not 0 bits includes second indication information, and the second indication information includes at least one indication bit.

A first state of each indication bit of the second indication information is used to indicate that the terminal has received activation or deactivation signaling for a corresponding sidelink grant resource, and a second state of each indication bit of the second indication information is used to indicate that the terminal has not received activation or deactivation signaling for a corresponding sidelink grant resource or a network has not configured a corresponding sidelink grant resource;

or
a first state of each indication bit of the second indication information is used to indicate that the terminal has activated or deactivated a sidelink grant resource, and a second state of each indication bit of the second indication information is used to indicate that the terminal has not processed a sidelink grant resource or a network has not configured a corresponding sidelink grant resource;

or
a first state of each indication bit of the second indication information is used to indicate that the terminal is requesting to activate or deactivate a sidelink grant resource, and a second state of each indication bit of the second indication information is used to indicate that the terminal is not requesting to process a sidelink grant resource or a network has not configured a corresponding sidelink grant resource.

Optionally, in the foregoing embodiment of this disclosure, the MAC CE includes a buffer status report BSR, the BSR is identified by a MAC PDU subheader, and the MAC PDU subheader includes a fifth bit field and a logical channel identifier LCID field used to identify the MAC CE as a BSR.

The fifth bit field is used to indicate that the terminal has received activation or deactivation signaling for a sidelink grant resource, or is used to indicate that the terminal has activated or deactivated a sidelink grant resource, or is used to indicate that the terminal is requesting to activate or deactivate a sidelink grant resource.

Optionally, in the foregoing embodiment of this disclosure, the MAC CE further includes a first indication field.

The first indication field is used to carry an identifier of an activated or deactivated sidelink grant resource, or is used to carry an identifier of a sidelink grant resource that the terminal is requesting to activate or deactivate, or is used to carry an identifier of an activated or deactivated sidelink grant resource and an identifier of a HARQ process, or is used to carry an identifier of a sidelink grant resource that the terminal is requesting to activate or deactivate and an identifier of a HARQ process.

Optionally, in the foregoing embodiment of this disclosure, the MAC CE further includes a second indication field.

The second indication field includes at least one indication bit.

A first state of each indication bit of the second indication field is used to indicate that the terminal has received activation signaling for a corresponding sidelink grant resource, and a second state of each indication bit of the second indication field is used to indicate that the terminal has received deactivation signaling for a corresponding sidelink grant resource;

or
a first state of each indication bit of the second indication field is used to indicate that the terminal has activated a corresponding sidelink grant resource, and a second state of each indication bit of the second indication field is used to indicate that the terminal has deactivated a corresponding sidelink grant resource;

or
a first state of each indication bit of the second indication field is used to indicate that the terminal is requesting to activate a corresponding sidelink grant resource, and a second state of each indication bit of the second indication field is used to indicate that the terminal is requesting to deactivate a corresponding sidelink grant resource.

Optionally, in the foregoing embodiment of this disclosure, the terminal further includes:
the transmitting module, configured to: in a case that at least two MAC CEs are to be transmitted, transmit the MAC CEs according to a preset priority rule.

The preset priority rule includes:
that a MAC CE used for a cell radio network temporary identifier C-RNTI or used to carry data from an uplink common control channel has a higher priority than a MAC CE for an uplink grant resource, and that a MAC CE for an uplink grant resource has a higher priority than a MAC CE for a sidelink grant resource; or the preset priority rule includes:
that a MAC CE used for a cell radio network temporary identifier C-RNTI or used to carry data from an uplink common control channel has a higher priority than a MAC CE for an uplink grant resource, and that a MAC CE for an uplink grant resource has the same priority as a MAC CE for a sidelink grant resource.

Optionally, in the foregoing embodiment of this disclosure, the terminal further includes:
a reply receiving module, configured to: in a case that the MAC CE is used to request to activate or deactivate a configured grant resource, receive reply information, where the reply information is used to indicate to the terminal that the terminal is allowed to activate or deactivate the grant resource, or the reply information is used to indicate to the terminal that the terminal is not allowed to activate or deactivate the grant resource.

Optionally, in the foregoing embodiment of this disclosure, the reply information includes any one of the following:
an identifier of the grant resource that the terminal is allowed to activate or deactivate;
an identifier of the grant resource that the terminal is allowed to activate or deactivate and an identifier of a HARQ process; and
third indication information including at least one indication bit, where each indication bit of the third indication information is used to indicate whether the terminal is allowed to activate or deactivate a corresponding grant resource.

The terminal provided in this embodiment of this disclosure is capable of implementing various processes that are implemented by the terminal in the method embodiments of FIG. 1 to FIG. 5. To avoid repetition, details are not described herein.

To sum up, in this embodiment of this disclosure, the MAC CE is used to indicate that the terminal has received activation or deactivation signaling for the configured grant resource, or the MAC CE is used to indicate that the terminal has activated or deactivated the configured grant resource, or the MAC CE is used to indicate that the terminal is requesting to activate or deactivate the configured grant resource. This can achieve consistent understanding between a network-side device and the terminal on an activation or deactivation status of the granted resource, thereby avoiding a resource collision problem caused by inconsistent understanding. In this embodiment of this disclosure, sidelink grant resource activation or deactivation initiated by a user is further implemented, so that activation or deactivation manners are more flexible and diverse.

It should be noted that the terminal provided in this embodiment of this disclosure is a terminal capable of executing the foregoing information transmitting method, and all embodiments of the foregoing information transmitting method are applicable to the terminal, with the same or similar beneficial effects achieved.

Figure 7:
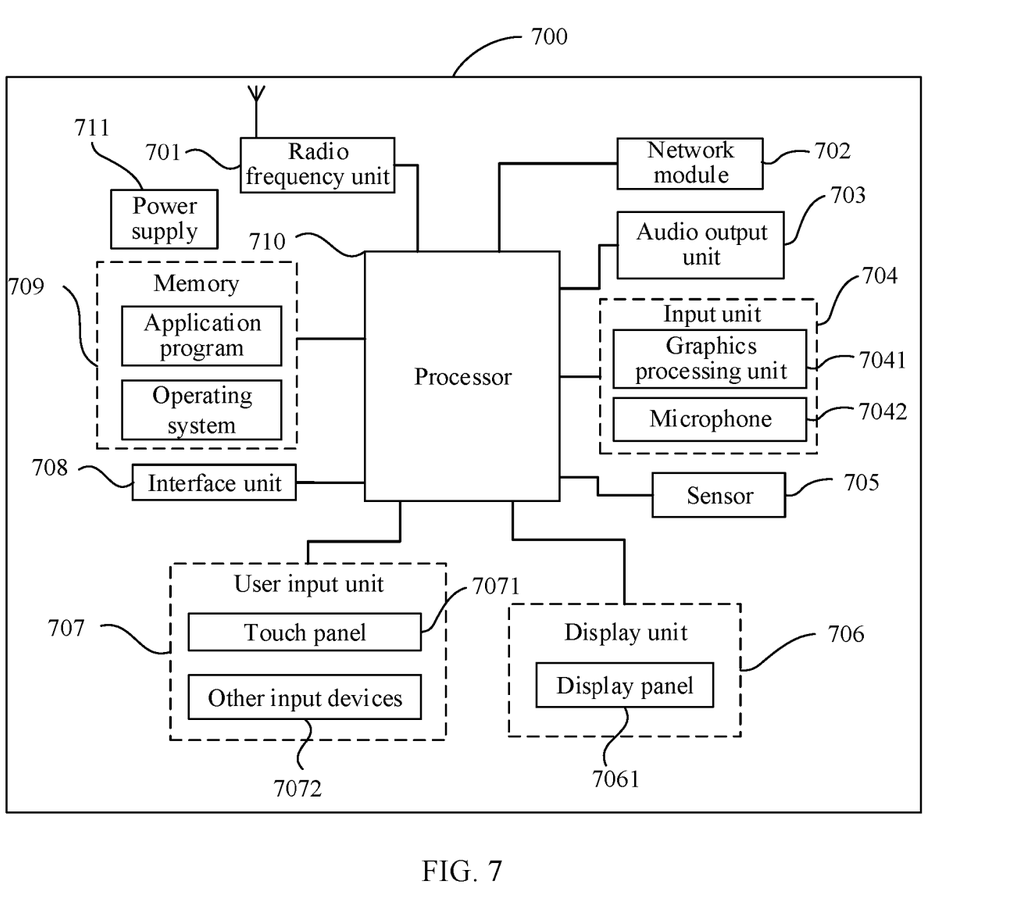
FIG. 7 is a second schematic structural diagram of a terminal according to an embodiment of this disclosure.

FIG. 7 is a schematic diagram of a hardware structure of a terminal for implementing the embodiments of this disclosure. The terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art can understand that the terminal structure shown in FIG. 7 does not constitute a limitation on the terminal. The terminal may include more or fewer components than those shown in the figure, or some components may be combined, or there may be a different component layout. In this embodiment of this disclosure, the terminal includes but is not limited to a mobile phone, a tablet computer, a notebook computer, a palmtop computer, an in-vehicle terminal, a wearable device, a pedometer, and the like.

The radio frequency unit 701 is configured to transmit a media access control protocol data unit MAC PDU, where the MAC PDU includes a media access control control element MAC CE.

The MAC CE is used to indicate that the terminal has received activation or deactivation signaling for a configured grant resource, or is used to indicate that the terminal has activated or deactivated a configured grant resource, or is used to request to activate or deactivate a configured grant resource.

The activation or deactivation signaling is used to activate or deactivate the configured grant resource.

To sum up, in this embodiment of this disclosure, the MAC CE is used to indicate that the terminal has received activation or deactivation signaling for the configured grant resource, or the MAC CE is used to indicate that the terminal has activated or deactivated the configured grant resource, or the MAC CE is used to indicate that the terminal is requesting to activate or deactivate the configured grant resource. This can achieve consistent understanding between a network-side device and the terminal on an activation or deactivation status of the granted resource, thereby avoiding a resource collision problem caused by inconsistent understanding. In this embodiment of this disclosure, sidelink grant resource activation or deactivation initiated by a user is further implemented, so that activation or deactivation manners are more flexible and diverse.

It should be noted that the terminal provided in this embodiment of this disclosure is a terminal capable of executing the foregoing information transmitting method, and all embodiments of the foregoing information transmitting method are applicable to the terminal, with the same or similar beneficial effects achieved.

It should be understood that, in this embodiment of this disclosure, the radio frequency unit 701 may be configured to transmit or receive a signal in an information transmitting/receiving or call process. Specifically, the radio frequency unit 701 receives downlink data from a base station, transmits the downlink data to the processor 710 for processing, and transmits uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may further communicate with a network and another device by using a wireless communications system.

The terminal provides wireless broadband Internet access for a user by using the network module 702, for example, helps the user transmit and receive e-mails, browse web pages, and access streaming media.

The audio output unit 703 may convert audio data received by the radio frequency unit 701 or the network module 702 or stored in the memory 709 into an audio signal and output the audio signal as a sound. In addition, the audio output unit 703 may further provide audio output (for example, a call signal reception sound or a message reception sound) related to a specific function performed by the terminal 700. The audio output unit 703 includes a speaker, a buzzer, a receiver, and the like.

The input unit 704 is configured to receive an audio or video signal. The input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. A processed image frame may be displayed on the display unit 706. The image frame processed by the graphics processing unit 7041 may be stored in the memory 709 (or another storage medium) or transmitted by the radio frequency unit 701 or the network module 702. The microphone 7042 may receive sounds and process such sounds into audio data. The processed audio data may be converted in a telephone call mode into a format that can be transmitted by the radio frequency unit 701 to a mobile communications base station, for outputting.

The terminal 700 further includes at least one sensor 705, for example, an optical sensor, a motion sensor, and another sensor. Specifically, the optical sensor includes an ambient light sensor and a proximity sensor. The ambient light sensor may adjust brightness of a display panel 7061 based on intensity of ambient light. When the terminal 700 moves to an ear, the proximity sensor may turn off the display panel 7061 and/or backlight. As a motion sensor, an accelerometer sensor may detect magnitudes of accelerations in all directions (typically three axes), may detect the magnitude and direction of gravity when the terminal is still, and may be applied to terminal posture recognition (for example, landscape/portrait mode switching, related gaming, or magnetometer posture calibration), functions related to vibration recognition (for example, pedometer or tapping), or the like. The sensor 705 may further include a fingerprint sensor, a pressure sensor, an iris sensor, a molecular sensor, a gyroscope, a barometer, a hygrometer, a thermometer, an infrared sensor, or the like. Details are not described herein.

The display unit 706 is configured to display information entered by the user or information provided for the user. The display unit 706 may include the display panel 7061, and the display panel 7061 may be configured in a form of a liquid crystal display (LCD), an organic light-emitting diode (OLED), or the like.

The user input unit 707 may be configured to receive input digit or character information and generate key signal input related to user setting and function control of the terminal. Specifically, the user input unit 707 includes a touch panel 7071 and other input devices 7072. The touch panel 7071, also referred to as a touchscreen, may collect a touch operation performed by a user on or near the touch panel 7071 (for example, an operation performed by the user on the touch panel 7071 or near the touch panel 7071 by using a finger or any appropriate object or accessory such as a stylus). The touch panel 7071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 710, receives a command transmitted by the processor 710, and executes the command. In addition, the touch panel 7071 may be implemented in a plurality of types, for example, as a resistive, capacitive, infrared, or surface acoustic wave touch panel. In addition to the touch panel 7071, the user input unit 707 may further include other input devices 7072. Specifically, the other input devices 7072 may include but are not limited to a physical keyboard, a function key (such as a volume control key or an on/off key), a trackball, a mouse, and a joystick. Details are not described herein.

Further, the touch panel 7071 may cover the display panel 7061. After detecting a touch operation on or near the touch panel 7071, the touch panel 7071 transmits the touch operation to the processor 710 to determine a type of a touch event. Then the processor 710 provides corresponding visual output on the display panel 7061 based on the type of the touch event. In FIG. 7, the touch panel 7071 and the display panel 7061 serve as two separate components to implement input and output functions of the terminal. However, in some embodiments, the touch panel 7071 and the display panel 7061 may be integrated to implement the input and output functions of the terminal. This is not specifically limited herein.

The interface unit 708 is an interface for connecting an external apparatus to the terminal 700. For example, the external apparatus may include a wired or wireless headset port, an external power (or battery charger) port, a wired or wireless data port, a memory card port, a port for connecting an apparatus having an identification module, an audio input/output (I/O) port, a video I/O port, an earphone port, and the like. The interface unit 708 may be configured to receive input (for example, data information and electric power) from the external apparatus, and transmit the received input to one or more elements in the terminal 700; or may be configured to transmit data between the terminal 700 and the external apparatus.

The memory 709 may be configured to store software programs and various data. The memory 709 may mainly include a program storage region and a data storage region. The program storage region may store an operating system, an application program required by at least one function (for example, an audio play function or an image play function), and the like. The data storage region may store data (for example, audio data or a phone book) created based on usage of the mobile phone. In addition, the memory 709 may include a high-speed random access memory, or may include a nonvolatile memory, for example, at least one magnetic disk storage device or a flash memory device, or another volatile solid-state storage device.

The processor 710 is a control center of the terminal, connects various parts of the entire terminal by using various interfaces and lines, and performs various functions and data processing of the terminal by running or executing software programs and/or modules stored in the memory 709 and calling data stored in the memory 709, to perform overall monitoring on the terminal. The processor 710 may include one or more processing units. Optionally, the processor 710 may integrate an application processor and a modem processor. The application processor mainly processes an operating system, a user interface, an application program, and the like. The modem processor mainly processes wireless communication. It can be understood that the modem processor may be alternatively not integrated in the processor 710.

The terminal 700 may further include the power supply 711 (for example, a battery) that supplies power to the components. Optionally, the power supply 711 may be logically connected to the processor 710 by using a power management system, to implement functions such as charging management, discharging management, and power consumption management by using the power management system.

In addition, the terminal 700 includes some functional modules that are not shown. Details are not described herein.

Optionally, an embodiment of this disclosure further provides a terminal, including a processor, a memory, and a computer program stored in the memory and capable of running on the processor. When the computer program is executed by the processor, the processes of the foregoing embodiments of the information transmitting method are implemented, with the same technical effects achieved. To avoid repetition, details are not described herein again.

An embodiment of this disclosure further provides a computer-readable storage medium. The computer-readable storage medium stores a computer program. When the computer program is executed by a processor, the processes of the foregoing embodiments of the information transmitting method are implemented, with the same technical effects achieved. To avoid repetition, details are not described herein again. For example, the computer-readable storage medium is a read-only memory (ROM), a random access memory (RAM), a magnetic disk, or an optical disc.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. As instructed by this disclosure, a person of ordinary skill in the art may develop many other manners without departing from principles of this disclosure and the protection scope of the claims, and all such manners fall within the protection scope of this disclosure.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An information transmitting method, applied to a terminal and comprising:
    transmitting a media access control protocol data unit MAC PDU, wherein the MAC PDU comprises a media access control control element MAC CE; wherein
    the MAC CE is used to indicate that the terminal has received activation or deactivation signaling for a configured grant resource, or is used to indicate that the terminal has activated or deactivated a configured grant resource, or is used to request to activate or deactivate a configured grant resource;
    wherein the MAC CE is identified by a MAC PDU subheader;
    the MAC PDU subheader comprises a logical channel identifier LCID field; and
    in a case that a value of the LCID field is a second preset value, the MAC CE is used to indicate that the terminal has received activation or deactivation signaling for a sidelink grant resource; or
    in a case that a value of the LCID field is a third preset value, the MAC CE is used to indicate that the terminal has activated or deactivated a sidelink grant resource; or
    in a case that a value of the LCID field is a fourth preset value, the MAC CE is used to indicate that the terminal is requesting to activate or deactivate a sidelink grant resource.

2. The method according to claim 1, wherein
    in a case that a value of the LCID field is a first preset value, the MAC CE is used to indicate activation or deactivation confirmation for the grant resource.

3. The method according to claim 2, wherein the MAC PDU subheader further comprises a first bit field and a second bit field; and
    the first bit field is used to indicate that the terminal has received activation or deactivation signaling for a sidelink grant resource, or activation or deactivation signaling for an uplink grant resource, and the second bit field is a reserved bit;
    or
    the first bit field is used to indicate that the terminal has received activation or deactivation signaling for a sidelink grant resource, or activation or deactivation signaling for an uplink grant resource, and the second bit field is used to indicate what the terminal has received is activation signaling or deactivation signaling;
    or
    the first bit field is a reserved bit, and the second bit field is used to indicate what the terminal has received is activation signaling or deactivation signaling;
    or,
    the MAC PDU subheader comprises a third bit field; and
    the third bit field is used to indicate that the terminal has activated the configured grant resource, or is used to indicate that the terminal has deactivated the configured grant resource;
    or,
    the MAC PDU subheader comprises a fourth bit field; and
    the fourth bit field is used to indicate that the terminal is requesting to activate the configured grant resource, or is used to indicate that the terminal is requesting to deactivate the configured grant resource.

4. The method according to claim 1, wherein
    in a case that a value of the LCID field is a fifth preset value, the MAC CE is used to indicate that the terminal has received activation signaling for a sidelink grant resource, or in a case that a value of the LCID field is a sixth preset value, the MAC CE is used to indicate that the terminal has received deactivation signaling for a sidelink grant resource; or
    in a case that a value of the LCID field is a seventh preset value, the MAC CE is used to indicate that the terminal has activated a sidelink grant resource, or in a case that a value of the LCID field is an eighth preset value, the MAC CE is used to indicate that the terminal has deactivated a sidelink grant resource; or
    in a case that a value of the LCID field is a ninth preset value, the MAC CE is used to indicate that the terminal is requesting to activate a sidelink grant resource, or in a case that a value of the LCID field is a tenth preset value, the MAC CE is used to indicate that the terminal is requesting to deactivate a sidelink grant resource.

5. The method according to claim 1, wherein the MAC PDU subheader further comprises a fifth bit field; and
    the fifth bit field is used to indicate what the terminal has received is activation signaling or deactivation signaling;
    or
    the fifth bit field is used to indicate that the terminal has activated the grant resource or deactivated the grant resource;
    or
    the fifth bit field is used to indicate that the terminal is requesting to activate the grant resource or deactivate the grant resource.

6. The method according to claim 1, wherein the MAC CE further comprises a field whose size is not 0 bits; and
    the field whose size is not 0 bits comprises an identifier of at least one sidelink grant resource, or an identifier of at least one sidelink grant resource and an identifier of at least one hybrid automatic repeat request HARQ process.

7. The method according to claim 1, wherein the MAC CE further comprises a field whose size is not 0;
    the field whose size is not 0 bits comprises first indication information, and the first indication information comprises at least one indication bit; and
    a first state of each indication bit of the first indication information is used to indicate that the terminal has received activation signaling for a corresponding sidelink grant resource, and a second state of each indication bit of the first indication information is used to indicate that the terminal has received deactivation signaling for a corresponding sidelink grant resource;
    or
    a first state of each indication bit of the first indication information is used to indicate that the terminal has activated a corresponding sidelink grant resource, and a second state of each indication bit of the first indication information is used to indicate that the terminal has deactivated a corresponding sidelink grant resource;

or
a first state of each indication bit of the first indication information is used to indicate that the terminal is requesting to activate a corresponding sidelink grant resource, and a second state of each indication bit of the first indication information is used to indicate that the terminal is requesting to deactivate a corresponding sidelink grant resource;
or,
the MAC CE further comprises a field whose size is not 0;
the field whose size is not 0 bits comprises second indication information, and the second indication information comprises at least one indication bit; and
a first state of each indication bit of the second indication information is used to indicate that the terminal has received activation or deactivation signaling for a corresponding sidelink grant resource, and a second state of each indication bit of the second indication information is used to indicate that the terminal has not received activation or deactivation signaling for a corresponding sidelink grant resource or a network has not configured a corresponding sidelink grant resource;
or
a first state of each indication bit of the second indication information is used to indicate that the terminal has activated or deactivated a sidelink grant resource, and a second state of each indication bit of the second indication information is used to indicate that the terminal has not processed a sidelink grant resource or a network has not configured a corresponding sidelink grant resource;
or
a first state of each indication bit of the second indication information is used to indicate that the terminal is requesting to activate or deactivate a sidelink grant resource, and a second state of each indication bit of the second indication information is used to indicate that the terminal is not requesting to process a sidelink grant resource or a network has not configured a corresponding sidelink grant resource.

8. The method according to claim 1, wherein the MAC CE comprises a buffer status report BSR, the BSR is identified by the MAC PDU subheader, and the MAC PDU subheader comprises a fifth bit field and a logical channel identifier LCID field used to identify the MAC CE as a BSR; and
the fifth bit field is used to indicate that the terminal has received activation or deactivation signaling for a sidelink grant resource, or is used to indicate that the terminal has activated or deactivated a sidelink grant resource, or is used to indicate that the terminal is requesting to activate or deactivate a sidelink grant resource.

9. The method according to claim 8, wherein the MAC CE further comprises a first indication field; and
the first indication field is used to carry an identifier of an activated or deactivated sidelink grant resource, or is used to carry an identifier of a sidelink grant resource that the terminal is requesting to activate or deactivate, or is used to carry an identifier of an activated or deactivated sidelink grant resource and an identifier of a HARQ process, or is used to carry an identifier of a sidelink grant resource that the terminal is requesting to activate or deactivate and an identifier of a HARQ process;
or,
the MAC CE further comprises a second indication field;
the second indication field comprises at least one indication bit; and
a first state of each indication bit of the second indication field is used to indicate that the terminal has received activation signaling for a corresponding sidelink grant resource, and a second state of each indication bit of the second indication field is used to indicate that the terminal has received deactivation signaling for a corresponding sidelink grant resource;
or
a first state of each indication bit of the second indication field is used to indicate that the terminal has activated a corresponding sidelink grant resource, and a second state of each indication bit of the second indication field is used to indicate that the terminal has deactivated a corresponding sidelink grant resource;
or
a first state of each indication bit of the second indication field is used to indicate that the terminal is requesting to activate a corresponding sidelink grant resource, and a second state of each indication bit of the second indication field is used to indicate that the terminal is requesting to deactivate a corresponding sidelink grant resource.

10. The method according to claim 1, wherein in a case that at least two MAC CEs are to be transmitted, the method further comprises:
transmitting the MAC CEs according to a preset priority rule, wherein
the preset priority rule comprises:
that a MAC CE used for a cell radio network temporary identifier C-RNTI or used to carry data from an uplink common control channel has a higher priority than a MAC CE for an uplink grant resource, and that a MAC CE for an uplink grant resource has a higher priority than a MAC CE for a sidelink grant resource; or
the preset priority rule comprises:
that a MAC CE used for a cell radio network temporary identifier C-RNTI or used to carry data from an uplink common control channel has a higher priority than a MAC CE for an uplink grant resource, and that a MAC CE for an uplink grant resource has the same priority as a MAC CE for a sidelink grant resource.

11. The method according to claim 1, wherein in a case that the MAC CE is used to request to activate or deactivate a configured grant resource, the method further comprises:
receiving reply information, wherein the reply information is used to indicate to the terminal that the terminal is allowed to activate or deactivate the grant resource, or the reply information is used to indicate to the terminal that the terminal is not allowed to activate or deactivate the grant resource;
wherein the reply information comprises any one of the following:
an identifier of the grant resource that the terminal is allowed to activate or deactivate;
an identifier of the grant resource that the terminal is allowed to activate or deactivate and an identifier of a HARQ process; and
third indication information comprising at least one indication bit, wherein each indication bit of the third indication information is used to indicate whether the terminal is allowed to activate or deactivate a corresponding grant resource.

12. A terminal, comprising: a processor, a memory, and a computer program stored in the memory and capable of running on the processor, wherein the computer program is executed by the processor to:

transmit a media access control protocol data unit MAC PDU, wherein the MAC PDU comprises a media access control control element MAC CE;

the MAC CE is used to indicate that the terminal has received activation or deactivation signaling for a configured grant resource, or is used to indicate that the terminal has activated or deactivated a configured grant resource, or is used to request to activate or deactivate a configured grant resource;

wherein the MAC CE is identified by a MAC PDU subheader;

the MAC PDU subheader comprises a logical channel identifier LCID field; and in a case that a value of the LCID field is a second preset value, the MAC CE is used to indicate that the terminal has received activation or deactivation signaling for a sidelink grant resource; or in a case that a value of the LCID field is a third preset value, the MAC CE is used to indicate that the terminal has activated or deactivated a sidelink grant resource; or in a case that a value of the LCID field is a fourth preset value, the MAC CE is used to indicate that the terminal is requesting to activate or deactivate a sidelink grant resource.

13. The terminal according to claim 12, wherein in a case that a value of the LCID field is a fifth preset value, the MAC CE is used to indicate that the terminal has received activation signaling for a sidelink grant resource, or in a case that a value of the LCID field is a sixth preset value, the MAC CE is used to indicate that the terminal has received deactivation signaling for a sidelink grant resource; or in a case that a value of the LCID field is a seventh preset value, the MAC CE is used to indicate that the terminal has activated a sidelink grant resource, or in a case that a value of the LCID field is an eighth preset value, the MAC CE is used to indicate that the terminal has deactivated a sidelink grant resource; or in a case that a value of the LCID field is a ninth preset value, the MAC CE is used to indicate that the terminal is requesting to activate a sidelink grant resource, or in a case that a value of the LCID field is a tenth preset value, the MAC CE is used to indicate that the terminal is requesting to deactivate a sidelink grant resource.

14. The terminal according to claim 12, wherein the MAC PDU subheader further comprises a fifth bit field; and the fifth bit field is used to indicate what the terminal has received is activation signaling or deactivation signaling;

or the fifth bit field is used to indicate that the terminal has activated the grant resource or deactivated the grant resource;

or the fifth bit field is used to indicate that the terminal is requesting to activate the grant resource or deactivate the grant resource.

15. The terminal according to claim 12, wherein the MAC CE further comprises a field whose size is not 0 bits; and the field whose size is not 0 bits comprises an identifier of at least one sidelink grant resource, or an identifier of at least one sidelink grant resource and an identifier of at least one hybrid automatic repeat request HARQ process.

16. The terminal according to claim 12, wherein in a case that a value of the LCID field is a first preset value, the MAC CE is used to indicate activation or deactivation confirmation for the grant resource.

17. The terminal according to claim 14, wherein the MAC PDU subheader further comprises a first bit field and a second bit field; and the first bit field is used to indicate that the terminal has received activation or deactivation signaling for a sidelink grant resource, or activation or deactivation signaling for an uplink grant resource, and the second bit field is a reserved bit;

or the first bit field is used to indicate that the terminal has received activation or deactivation signaling for a sidelink grant resource, or activation or deactivation signaling for an uplink grant resource, and the second bit field is used to indicate what the terminal has received is activation signaling or deactivation signaling;

or the first bit field is a reserved bit, and the second bit field is used to indicate what the terminal has received is activation signaling or deactivation signaling;

or, the MAC PDU subheader comprises a third bit field; and the third bit field is used to indicate that the terminal has activated the configured grant resource, or is used to indicate that the terminal has deactivated the configured grant resource;

or, the MAC PDU subheader comprises a fourth bit field; and the fourth bit field is used to indicate that the terminal is requesting to activate the configured grant resource, or is used to indicate that the terminal is requesting to deactivate the configured grant resource.

18. A non-transitory computer-readable storage medium, wherein the computer-readable storage medium stores a computer program, and when the computer program is executed by a processor, the steps of the information transmitting method according to claim 1 are implemented.

* * * * *